United States Patent [19]
Knotter et al.

[11] Patent Number: 4,744,428
[45] Date of Patent: May 17, 1988

[54] SCALE

[76] Inventors: David G. Knotter, 3522 E. Pasadena Ave., Phoenix, Ariz. 85018; Donald R. Levin, 1196 Oxford Ct., Highland Park, Ill. 60035; Jody L. Numbers, 7908 E. Oak, Scottsdale, Ariz. 85257

[21] Appl. No.: 912,912
[22] Filed: Sep. 29, 1986
[51] Int. Cl.⁴ .................. G01G 21/28; G01G 1/36
[52] U.S. Cl. .................... 177/127; 177/247; 177/DIG. 9
[58] Field of Search .............. 177/127, 165, 247, 252, 177/DIG. 9

[56] References Cited
U.S. PATENT DOCUMENTS 205,684 7/1878 Rogers .
634,162 10/1899 Bracktle .
783,329 2/1905 Sweet .
3,082,833 3/1963 Myers .................... 177/127
3,968,849 7/1976 Dale et al. .
4,050,531 9/1977 Ashbrook ............... 177/DIG. 9

Primary Examiner—George H. Miller, Jr.
Attorney, Agent, or Firm—Cahill, Sutton & Thomas

[57] ABSTRACT

A scale small enough and light enough to be carried in a person's pocket by virtue of the fact that most of its components are formed of lightweight molded plastic material. The fulcrum for the beam of the scale is provided by a pair of pointed, metal fulcrum posts adapted to cooperate with a pair of metal bearing inserts in the beam. A sliding weight which is movable along the beam has a metal insert to increase its weight and the metal insert is positioned in the plane of the fulcrum when the sliding weight is in its zero position.

5 Claims, 2 Drawing Sheets

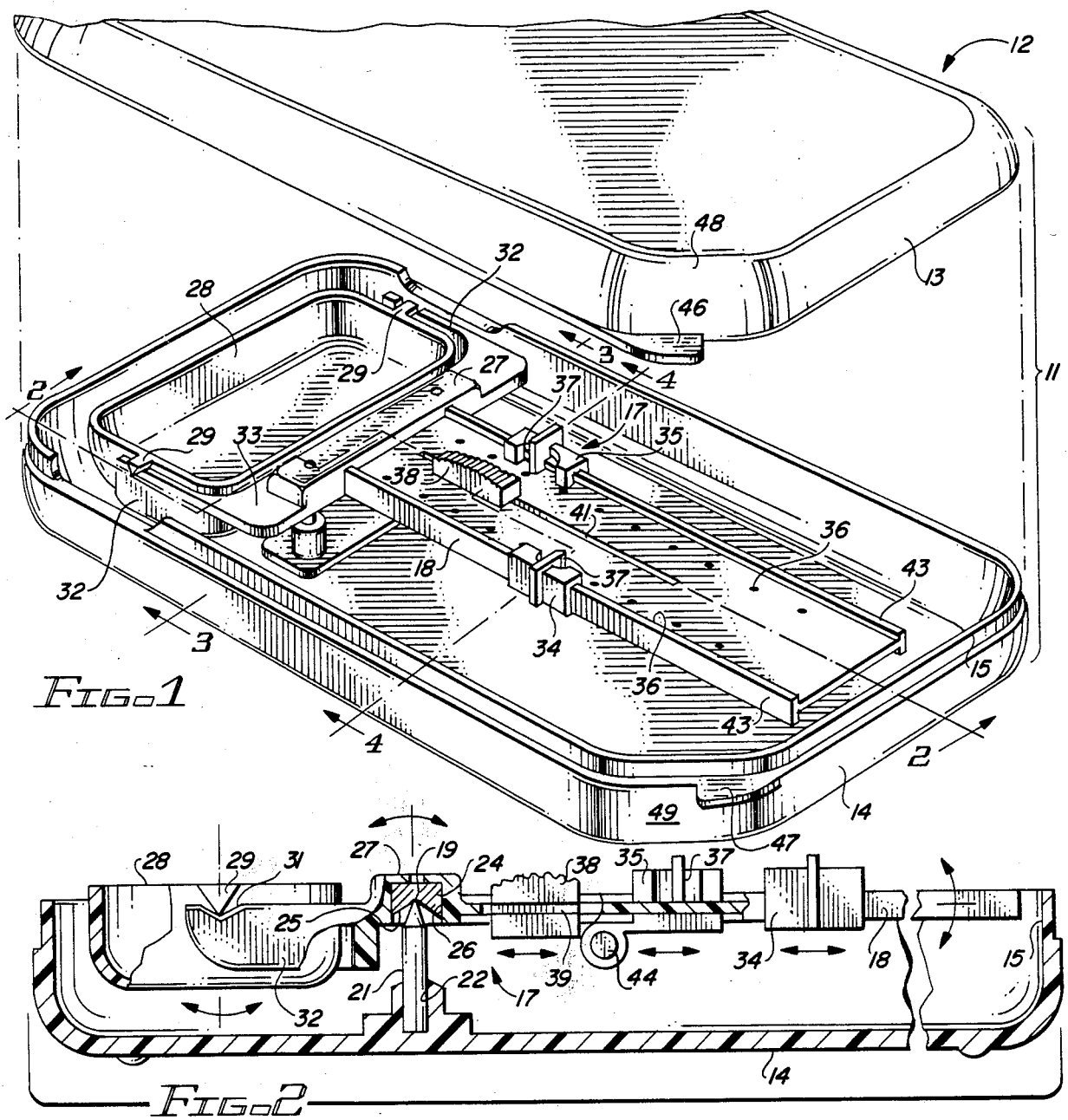
Fig. 1
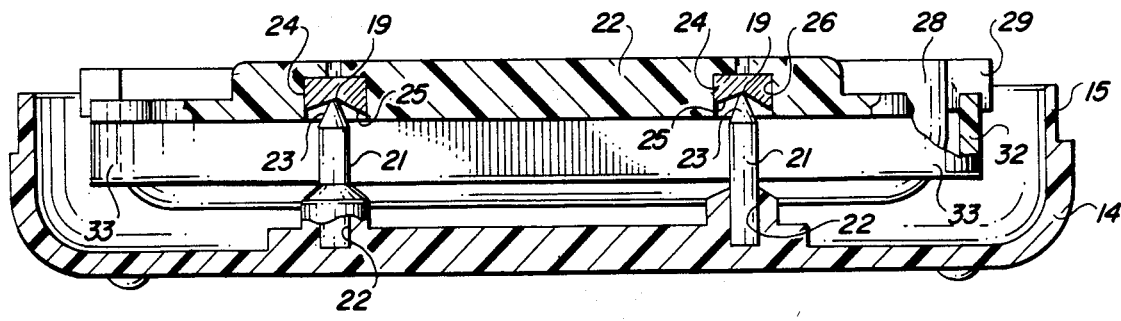
Fig. 2
Fig. 3

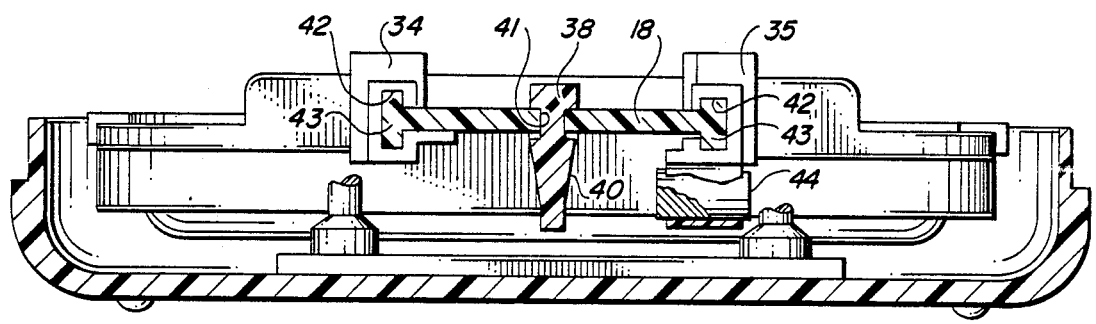
FIG.4
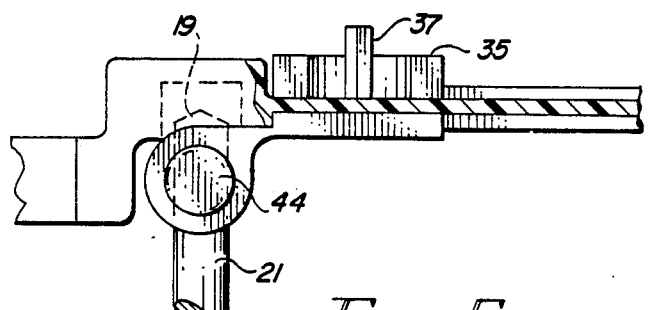
FIG.5
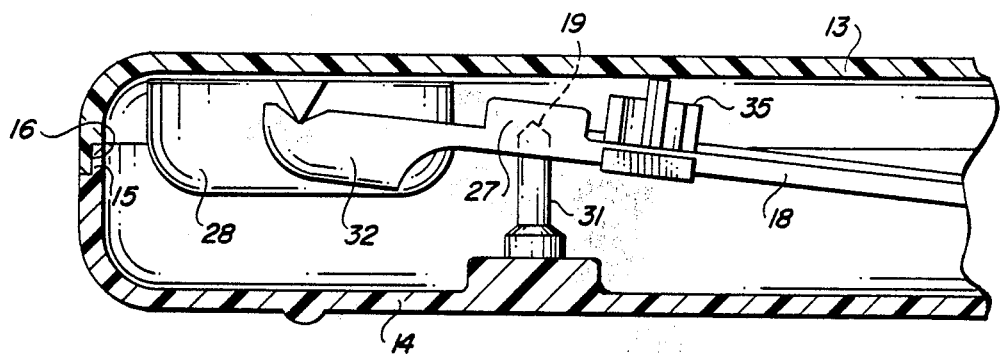
FIG.9
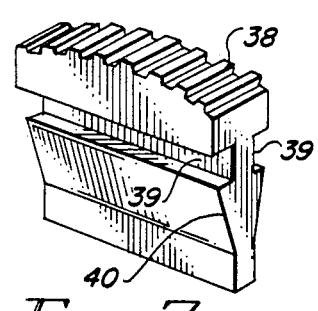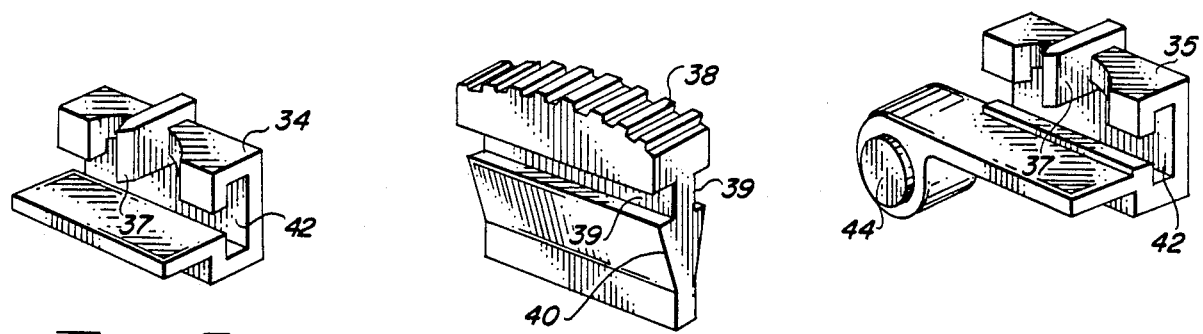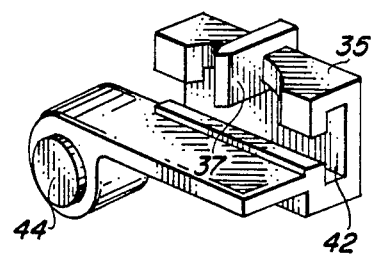
FIG.6  FIG.7  FIG.8

SCALE

TECHNICAL FIELD

This invention is concerned with lightweight portable scales small enough to be carried in a person's pocket.

BACKGROUND ART

Portable scales with their own carrying cases have been known for some time. U.S. Pat. No. 205,684, granted July 2, 1878 to B. F. Rogers, for "Weighing-Scales", U.S. Pat. No. 634,162, granted Oct. 3, 1899, to W. S. Bracktle, for "Portable Weighing Scale", and U.S. Pat. No. 783,329, granted Feb. 21, 1905, to M. A. Sweet, for "Weighing Scale", disclose early examples of such scales. Typical of that era, these scales were made from expensive machined metal parts and included polished wood cases.

With the discovery of lightweight moldable plastic materials it has become possible to miniaturize and further reduce the weight of portable scales so they can be carried in one's pocket and yet display reasonable accuracy in weighing substances or objects. U.S. Pat. No. 3,968,849, granted July 13, 1976, to J. D. Dale and D. G. Knotter for "Lightweight Portable Scale" discloses a scale in which a number of the components thereof are formed of molded plastic material. In an effort to achieve compactness, the scale of the Dale et al patent has a foldable balancing mechanism which permits the mechanism to be stored in a case which is actually smaller than the mechanism when the latter is in use. Unfortunately, the foldable mechanism also imparts complexity and, consequently, higher cost to the scale as well.

DISCLOSURE OF INVENTION

The scale of this invention is housed in a thin two-piece molded plastic carrying case having an overall size small enough to fit into a shirt pocket. The lower portion of the carrying case serves as a base for the weighing mechanism which comprises a balance beam and a substance holder. The overall length of the balance mechanism is kept to a minimum by utilizing a sliding measuring weight which has a metallic insert to add to the mass of the sliding weight. This permits the scale portion of the beam to be foreshortened and still give the scale the weighing capacity that is desired.

To hold down on the mass of the substance holder portion of the mechanism required to achieve equilibrium of the mechanism the sliding weight is constructed in such a manner that the metallic insert therein rests essentially in the plane of the fulcrum for the balance beam when the sliding weight is in its zero position. In this position the metallic insert is essentially neutral so far as the balance of the mechanism is concerned.

The fulcrum arrangement for the scale of this invention is simple and inexpensive but highly reliable and virtually friction free to ensure accurate operation of the scale. The fulcrum arrangement comprises a pair of metallic fulcrum posts projecting upwardly from the base provided by the lower portion of the case. Cooperating with these posts is a pair of metallic inserts carried by the beam and positioned to engage the posts. One of the pair of posts or pair of inserts is pointed for engagement with conical recesses in the other pair. This two-point contact between the beam and the fulcrum posts accurately positions the weighing mechanism within the case to ensure that it does not come into contact with the sidewalls of the case.

BRIEF DESCRIPTION OF THE DRAWING

The invention is described in greater detail hereinafter by reference to the accompanying drawings wherein:

FIG. 1 is a partial, exploded perspective view of a scale embodying this invention;

FIG. 2 partial, longitudinal, sectional view through the scale taken generally as indicated by the line 2—2 in FIG. 1;

FIG. 3 is a transverse sectional view through the scale taken as indicated by the line 3—3 in FIG. 1;

FIG. 4 is a transverse sectional view through the scale taken as indicated by the line 4—4 in FIG. 1;

FIG. 5 an enlarged longitudinal sectional view of a portion of the scale;

FIG. 6 is an enlarged perspective view of one of the slide weights used in the scale;

FIG. 7 is an enlarged perspective view of an equilibrium weight used in the scale;

FIG. 8 is an enlarged perspective view of another slide weight used in the scale; and FIG. 9 a longitudinal sectional view through a portion of the scale with the top portion of the carrying case in place.

BEST MODE FOR CARRYING OUT THE INVENTION

One of the principal objectives of this invention is to provide a lightweight, miniaturized, portable scale which can easily and comfortably be transported in a person's shirt or coat pocket. To meet this objective, the scale should be contained in a protective carrying case having overall dimensions of six inches or less in length, three inches or less in width and less than one inch in thickness, or height. Desirably, the complete scale, including the carrying case, should have an overall weight of three ounces or less. Finally, the scale construction must be such that it can be easily and inexpensively manufactured, yet give accurate and reliable weight measurments for a variety of substances, such as, for example, powders, granules, shredded materials and liquids.

The criteria just mentioned are met by the scale of this invention depicted in FIG. 1 and identified generally by the reference number 11. The scale comprises a two-part carrying case 12, having an upper, or cover, portion 13, and a lower, or base, portion 14. The upper and lower portions 13 and 14 of carrying case 12 are molded of lightweight plastic material to hollow dish-like configurations. These case portions 13 and 14, as well as the majority of the other components of the scale can advantageously be formed of acrylonitrile-butadiene-styrene (ABS) material. The lower cover portion 14 has an upstanding rim 15, which is received in a recess 16 in the rim of the upper portion 13. Frictional engagement of the lower portion rim 15 in the rim of upper portion 13 retains the upper cover portion 13 of the carrying case on the lower portion 14 when the scale is not in use.

The lower portion 14 of carrying case 12 serves as a base for a weighing mechanism indicated generally by reference numeral 17. Weighing mechanism 17 comprises a balance beam 18 mounted for pivotal movement on a fulcrum 19 provided by a pair of fulcrum posts 21 held in upstanding position in recesses 22 molded in the bottom wall of lower portion 14 of carrying case 12 (See FIGS. 2 and 3). The fulcrum posts 21 have conical points 23 at their upper ends which are adapted to cooperate with bearing inserts 24 which have conical recesses 25 in their lower faces. The bearing inserts 24 are preferably received in recesses 26 molded into a cross-bar portion 27 of balance beam 18.

In order for the weighing mechanism 17 to function accurately and reliably, it is essential that the apparatus constituting the fulcrum 19 provide a virtually frictionless, but positive, support for the balance beam 18 and the other components of the weighing mechanism. The combination of a pair of fulcrum posts 21 and bearing inserts 24 provide just such a fulcrum. To enhance the reliability and useful life of the weighing mechanism 17 it is desired that the fulcrum posts 21 be machined from stainless steel metal and that the bearing inserts 24 be machined from brass. This combination of materials provides an ideal fulcrum 19 and yet, because the fulcrum post 21 and bearing inserts 24 constitute but a small portion of the overall scale 11, they add very little weight to the scale.

In passing it should be also noted that, although the fulcrum arrangement is illustrated in the drawings as including fulcrum posts 21 with conical points 23 and bearing inserts 24 with conical recesses 25, this configuration can be reversed. In other words, bearing inserts with conical points cooperating with conical recesses in the fulcrum posts could provide an equally effective and reliable fulcrum arrangement. Either arrangement of fulcrum posts 21 and bearing inserts 24 offers the additional advantage that in combination they serve not only to provide the frictionless fulcrum for the balance beam 18 and associated components but also serve to position the balance beam within case portion 14 to ensure that the weighing mechanism 17 does not engage and is not adversely affected by the side walls of case lower portion 14. This is extremely important for lightweight scales intended to measure the weight of small quantities of substances or materials.

Substances to be weighed are placed in a cup-like holder 28 which is pivotally supported on one end of the balance beam 18 by means of knife-edge trunnions 29 residing in V-shaped notches 31 in the arms 32 of a yolk 33 integrally molded on to the cross-bar portion 27 of balance beam 18. Pivotal mounting of the holder 28 in yolk 33 ensures that the substance therein will not be disturbed when the beam tilts as the substance is being weighed. Thus, even a liquid contained in holder 28 will not be spilled during the weighing procedure.

Actual weighing of substances in holder 28 is accomplished by moving sliding weights 34 and 35 along that portion of balance beam 18 extending away from substance holder 29 and on the opposite side of the fulcrum 19 from the holder 28. This portion of balance beam 18 serves as a scale and has indicia 36 thereon for identifying the measured weight of the substance in holder 28.

In accordance with the invention, one of the sliding weights, 34 is a "fine" weighing weight and the other weight 35 is a "coarse" weighing weight. For example, sliding weight 34 is of light weight so that in traversing the length of balance beam 18 from the zero position for the weight to the end of the balance beam, this sliding weight is capable of balancing substances in the holder 28 of up to one unit, say one ounce. The coarse sliding weight 35, being considerably heavier than sliding weight 34, is capable of balancing and indicating the weight of larger quantities of substances in holder 28. In the preferred form of the invention the coarse weight 35 in moving from its zero position to the end of balance 18 is capable of balancing substances weighing up to nine units, for example, nine ounces.

In use, the balancing mechanism 17 of this invention is employed in the same fashion as prior scales employing both coarse and fine sliding weights. Say, for example, that a quantity of substance is placed in holder 28 which weighs 4.5 units. The coarse sliding weight 35 is moved toward the free end of balance beam 18 to a position in which it just fails to balance the substance in holder 28. In this example, the would be to a position indicating four units of weight. The fine sliding weight 34 is then moved away from its zero position toward the free end of balance beam 18 until the combinded weight of weights 35 and 34 exactly balance the weight of the substance in holder 28. In this example, that would be a position on balance beam 18 opposite indicia indicating 0.5 units. If desired, each of the sliding weights 34 and 35 may be provided with a pointer portion 37 to assist in reading the indicated indicia 36 (See FIGS. 1, 6 and 8).

The balance beam 18 of weighing mechanism 17 also preferably carries an equilibrium weight 38 by which small variations in the weights of the various components of the weighing mechanism may be compensated for to ensure accurate weighing capability of the mechanism. Prior to using the scale 11, with sliding weights 34 and 35 in their zero positions and no material in holder 28, the equilibrium weight 38 is moved along balance beam 18 to a position where all of the components of the weighing mechanism are in equilibrium.

Weight 38 has shallow slots 39 in the side walls thereof and a tapered depending portion 40 which enables the weight 38 to be snapped into a guide slot 41 in the balance beam 18. (See FIGS. 1, 2 and 7) The tapered portion 40 of equilibrium weight 38 at its widest part is only slightly wider than slot 41 in balance beam 18 and because both of the components are made of plastic material having some resiliency it is possible to assemble the weight 38 to the beam 18 by simply pressing the tapered portion 40 through the slot 41 until the sides of slot 18 snap into place in the slots 39 in the equilibrium weight 38. Sliding weights 34 and 35, on the other hand, preferably have molded therein channels 42 for slidingly encompassing flange-like edge portions 43 of balance beam 18 (See FIGS. 1, 4, 6 and 8).

As mentioned previously, virtually all of the major components of a scale 11 constructed in accordance with this invention are made from molded lightweight plastic materials in order to hold the weight of the scale to an absolute minimum. But it is highly desireable that the scale 11 be capable of measuring weights in useful amounts greater than the weight of the scale itself. For example, to be useful, a scale, although weighing less than three ounces itself, should have a capacity of at least ten ounces. In order to weigh amounts of materials up to that weight the scale must have a long balance beam 18 or a heavy coarse sliding weight 35 must be used. A long balance beam 18 would undesireably increase both the weight and the overall size of the scale 11 and the carrying case 12 forming a part thereof.

With this invention, the length and weight of the balance beam 18 can be held to an absolute minimum because the coarse sliding weight 35 has a metallic insert 44 associated therewith to increase its mass (See FIGS. 2, 4 and 8). By increasing the mass of sliding weight 35, it is possible to balance, i.e. weigh, larger quantities of substances in the holder 28. However, were the metallic insert 44 placed directly beneath the pointer 37 of weight 35 as has been conventional practice in prior scales, the mass of the container 28 and its associated supporting yolk 32 would be required to be increased to provide equilibrium of the weighing mechanism 17 when the slide weights 34 and 35 are in their zero positions and the holder 28 is empty. Increasing the weight of the holder 28 for this purpose is wasteful of material and unnecessarially increases the weight of the scale 11.

To avoid such undesireable measures the coarse weight 35 is constructed in such a manner that the heavy metallic insert 44 therein is offset from the pointer 37 of the weight in the direction of the fulcrum 19 for the balance beam 18. Indeed, the metallic insert 44 is offset to an extent that when the coarse sliding weight 35 is in its zero position, adjacent the cross-bar portion 27 of balance beam 18, the metallic insert is disposed substantially in the plane of fulcrum 19, i.e. the imaginary vertical plane containing the center lines of fulcrum posts 21 and 22. With the center of insert 44 alligned precisely in the plane of fulcrum 19 the insert becomes essentially neutral so far as balance of the balance beam 18 and the holder 28 are concerned when the weight 35 is in its zero position and the holder 28 is empty. This greatly minimizes the amount of mass that must be incorporated into the holder 28 portion of the weighing mechanism 17. As the coarse sliding weight 35 is moved away from its zero position so that metallic insert 44 is moved away from the plane of fulcrum 19 the full mass of the metallic insert can be used to offset and measure the weight of substances contained in holder 28 with a fairly short range of movement of slide weight 35. Hence, the length of balance beam 18 can be held to the minimum.

Another feature of this invention concerns the manner in which the components of the weighing mechanism 17 are blocked, or held, against undesirable movement within case 12 when the scale is not in use and the cover portion 13 is in place on the lower portion 14 of the case. This condition is illustrated in FIG. 9 and it will be noted that the interior dimensions of case 12 are such that with the cover portion 13 in position on the lower portion 14 of the case the inner surface of cover portion 13 engages the upper rim of substance holder 28 and also engages an upper region of sliding weight 35 when it is in its zero position. In other words, when case cover portion 13 is applied to lower portion 14 it engages weight 35 and depresses balance beam 18 so that holder 28 is raised up into contact with the cover portion 13. In this manner the bearing inserts 24 are pressed into contact with the conical points 23 of fulcrum posts 21 so that the weighing mechanism 17 is held tightly between the fulcrum posts 21 and the inner surface of cover portion 13 of the case. Owing to the natural resiliency of the plastic materials from which the major components of the scale are made, sufficient interference between the case cover portion 13 and these components of the weighing mechanism 17 can be provided without damage to any of the components of the weighing mechanism.

One further feature can, if desired, be incorporated into the scale 11. The upper, or cover, portion 13 and the lower, or base, portion 14 of the carrying case 12 can be provided with separation tabs 46 and 47 respectively (See FIG. 1) to facilitate removal of the upper portion 13 of the case. In use, the separation tabs 46 and 47 are respectively placed between the thumb and index finger of the user and separated by squeezing movement of these digits. The separation tabs 46 and 47 are preferably positioned in chopped off corner regions 48 and 49 of the carrying case 12 so as not to increase the external dimensions of the carrying case. These chopped off corner regions 48 and 49 should be positioned in that end of the carrying case 12 adjacent the free end of balance beam 18 where there is plenty of space between the side edges of the carrying case and the beam 18.

What is claimed is:

1. A lightweight portable scale comprising a base, a beam having a substance holder at one end thereof and a scale extending toward the opposite end thereof, a sliding weight movably carried by said beam for movement along said scale, a pair of metallic fulcrum posts projecting upwardly from said base, and a pair of metallic bearing inserts in said beam for cooperation with said fulcrum posts, one pair of the pair of posts or the pair of inserts having pointed projections thereon receivable in tapered recesses in the other pair for positioning and pivotally supporting said beam, said sliding weight being movable from a zero position to a position near the said opposite end of the beam and said sliding weight when in its zero position having a portion thereof disposed substantially in an imaginary plane containing the fulcrum of the beam, whereby to minimize the weight of the substance holder required to balance the beam when the sliding weight is in its zero position.

2. The portable scale of claim 1 further characterized in that said sliding weight is formed of molded plastic material and has a metallic insert therein in the portion thereof which can be positioned in the plane containing the fulcrum.

3. A lightweight portable scale comprising a base, a beam having a substance holder at one end thereof and a scale extending toward the opposite end thereof, means providing a fulcrum for said beam, and a sliding weight carried by said beam for movement along said scale from a zero position to a position near the opposite end of the beam, said base being provided by the lwoer portion of a two-part case having upper and lower portions adapted to contain said beam and said substance holder when said beam is positioned on said fulcrum means, said case having a generally rectangular configuration with one corner region thereof chopped off and the upper and lower portions of the case having separating tabs projecting therefrom in said one corner region.

4. A lightweight portable scale comprising a base, a beam having a substance holder at one end thereof and a scale extending toward the opposite end thereof, means providing a fulcrum for said beam, and a sliding weight carried by said beam for movement along said scale from a zero position to a position near the said opposite end of the beam, said sliding weight when in its zero position having a portion thereof disposed substantially in an imaginary plane containing the fulcrum of the beam whereby to minimize the weight of the substance holder required to balance the beam when the sliding weight is in its zero position.

5. The portable scale of claim 4 further characterized in that said sliding weight is formed of molded plastic material and has a metallic insert therein in the portion thereof which can be positioned in the plane containing the fulcrum.

* * * * *